United States Patent
Suzuki

(10) Patent No.: US 11,192,556 B2
(45) Date of Patent: Dec. 7, 2021

(54) VEHICLE DRIVING APPARATUS

(71) Applicant: SUBARU CORPORATION, Tokyo (JP)

(72) Inventor: Hiroyuki Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 16/503,080

(22) Filed: Jul. 3, 2019

(65) Prior Publication Data
US 2020/0101975 A1  Apr. 2, 2020

(30) Foreign Application Priority Data

Sep. 27, 2018  (JP) .............................. JP2018-181986

(51) Int. Cl.
*B60W 30/20* (2006.01)
*B60K 17/356* (2006.01)

(52) U.S. Cl.
CPC ........... *B60W 30/20* (2013.01); *B60K 17/356* (2013.01); *B60W 2510/087* (2013.01); *B60W 2552/15* (2020.02)

(58) Field of Classification Search
CPC ................ B60W 30/18; B60W 30/20; B60W 2030/203; B60W 2030/206;
(Continued)

(56) References Cited

U.S. PATENT DOCUMENTS 7,496,435 B2 * 2/2009 Iwatsuki ............... B60W 10/08
701/22

7,877,142 B2 * 1/2011 Moaddeb ............. A61N 1/3627
607/9
(Continued)

FOREIGN PATENT DOCUMENTS

JP    2003-326995 A    11/2003
JP    2009-136092 A     6/2009
(Continued)

OTHER PUBLICATIONS

Japanese Notice of Reasons for Refusal issued in corresponding Japanese Patent Application No. 2018-181986, dated Jun. 16, 2020, with English translation.

*Primary Examiner* — Angelina Shudy
(74) *Attorney, Agent, or Firm* — McDermott Will & Emery LLP

(57) ABSTRACT

A vehicle driving apparatus, configured to drive a vehicle including first and second wheels, includes first and second motors, first and second power transmission mechanisms, and a controller. The first motor is configured to generate first driving torque that rotates the first wheel. The second motor is configured to generate second driving torque that rotates the second wheel in a direction same as a direction in which the first wheel is rotated. The first and second power transmission mechanisms are configured to transmit the first and second driving torque from the first and second motors to the first and second wheels, respectively. The controller is configured to perform torque distribution control in a case where a gear rattle occurrence condition is satisfied. The torque distribution control drives the first motor to thereby decrease the first driving torque and drives the second motor to thereby increase the second driving torque.

8 Claims, 5 Drawing Sheets

(58) Field of Classification Search
CPC ........... B60W 10/04–16; B60W 20/00; B60W 20/30; B60W 20/50; B60W 2552/15; B60W 2510/087; B60W 2510/083; B60W 2510/084; B60W 2510/0657; B60W 2510/0661; B60W 2520/40; B60W 2510/105; B60W 2510/1055; B60W 2710/0666; B60W 2710/0672; B60W 2710/083; B60W 2710/085; B60W 2710/105; B60W 2710/1055; B60K 17/34; B60K 17/356

See application file for complete search history.

(56) References Cited

U.S. PATENT DOCUMENTS

| | | | | |
|---|---|---|---|---|
| 8,924,055 | B2* | 12/2014 | Shimodaira | B60L 58/10 701/22 |
| 9,091,337 | B2* | 7/2015 | Ko | B62D 3/04 |
| 9,227,637 | B2* | 1/2016 | Nakatsu | B60W 30/18127 |
| 9,637,108 | B2* | 5/2017 | Ueno | B60W 30/025 |
| 10,081,102 | B1* | 9/2018 | Berkowitz | F16H 57/12 |
| 2005/0187068 | A1* | 8/2005 | Kim | F16D 48/064 477/70 |
| 2009/0107790 | A1* | 4/2009 | Degler | F16F 15/12366 192/3.29 |
| 2010/0299011 | A1* | 11/2010 | Fujimoto | B60L 15/28 701/22 |
| 2013/0066509 | A1 | 3/2013 | Nakamura et al. | |
| 2013/0173100 | A1* | 7/2013 | Takagi | B60L 50/51 701/22 |
| 2014/0144719 | A1* | 5/2014 | Morgan | B60K 17/344 180/65.31 |
| 2015/0158493 | A1* | 6/2015 | Nakatsu | B60W 10/22 701/22 |
| 2015/0210266 | A1* | 7/2015 | Yang | B60K 6/52 701/22 |
| 2017/0047810 | A1* | 2/2017 | Riddiford | H02K 7/1004 |
| 2017/0106853 | A1* | 4/2017 | Rusch | B60W 10/08 |
| 2017/0232958 | A1* | 8/2017 | Hata | B60K 6/52 701/22 |
| 2018/0015840 | A1* | 1/2018 | Sawada | B60L 15/20 |
| 2018/0055701 | A1* | 3/2018 | Tang | A61G 1/0287 |
| 2019/0100114 | A1* | 4/2019 | Sawada | B60W 30/20 |
| 2019/0291591 | A1 | 9/2019 | Suzuki et al. | |

FOREIGN PATENT DOCUMENTS

| | | |
|---|---|---|
| JP | 2011-250648 A | 12/2011 |
| JP | 2018-093645 A | 6/2018 |

* cited by examiner (USUAL TRAVEL STATE)

(TORQUE-DISTRIBUTION-CONTROLLED TRAVEL STATE)

(TORQUE CORRECTION AMOUNT)

| GRADIENT [deg] | TRAVEL SPEED [km/h] | | | | | | |
|---|---|---|---|---|---|---|---|
| | −3 | −1 | −0.1 | 0 | +0.1 | 1 | 3 |
| −20 | 0 | 0 | 0 | 0 | 0 | 0 | 0 |
| −10 | 0 | 0 | 0 | 0 | 2 | 2 | 0 |
| −5 | 0 | 0 | 0 | 0 | 4 | 2 | 0 |
| 0 | 0 | 2 | 4 | 0 | 4 | 2 | 0 |
| +5 | 0 | 2 | 4 | 0 | 2 | 1 | 0 |
| +10 | 0 | 2 | 2 | 0 | 1 | 0 | 0 |
| +20 | 0 | 0 | 0 | 0 | 0 | 0 | 0 |

FIG. 4

VEHICLE DRIVING APPARATUS

CROSS-REFERENCE TO RELATED APPLICATIONS

The present application claims priority from Japanese Patent Application No. 2018-181986 filed on Sep. 27, 2018, the entire contents of which are hereby incorporated by reference.

BACKGROUND

The technology relates to a vehicle driving apparatus that includes a motor and is to be mounted on a vehicle or any other movable body.

A vehicle driving apparatus including a motor has been developed as a driving source that drives a wheel of a vehicle. Such a vehicle driving apparatus is disclosed in, for example, Japanese Unexamined Patent Applications Publication Nos. 2009-136092, 2011-250648, and 2003-326995.

SUMMARY

An aspect of the technology provides a vehicle driving apparatus configured to drive a vehicle having a first wheel and a second wheel. The vehicle driving apparatus includes a first motor, a first power transmission mechanism, a second motor, a second power transmission mechanism, and a controller. The first motor is configured to generate first driving torque that rotates the first wheel. The first power transmission mechanism is configured to transmit the first driving torque from the first motor to the first wheel. The second motor is configured to generate second driving torque that rotates the second wheel in a direction same as a direction in which the first wheel is rotated. The second power transmission mechanism is configured to transmit the second driving torque from the second motor to the second wheel. The controller is configured to perform torque distribution control in a case where a gear rattle occurrence condition is satisfied. The gear rattle occurrence condition is a condition that a travel speed of the vehicle is equal to or lower than a predetermined speed, the first driving torque is greater than a first threshold, and the second driving torque is smaller than a second threshold. The second threshold is set to be smaller than the first threshold. The torque distribution control drives the first motor to thereby decrease the first driving torque and drives the second motor to thereby increase the second driving torque.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 4 is an explanatory diagram illustrating an example of a look-up table that is used in the torque distribution control illustrated in FIG. 2.

DETAILED DESCRIPTION

Figure 1:
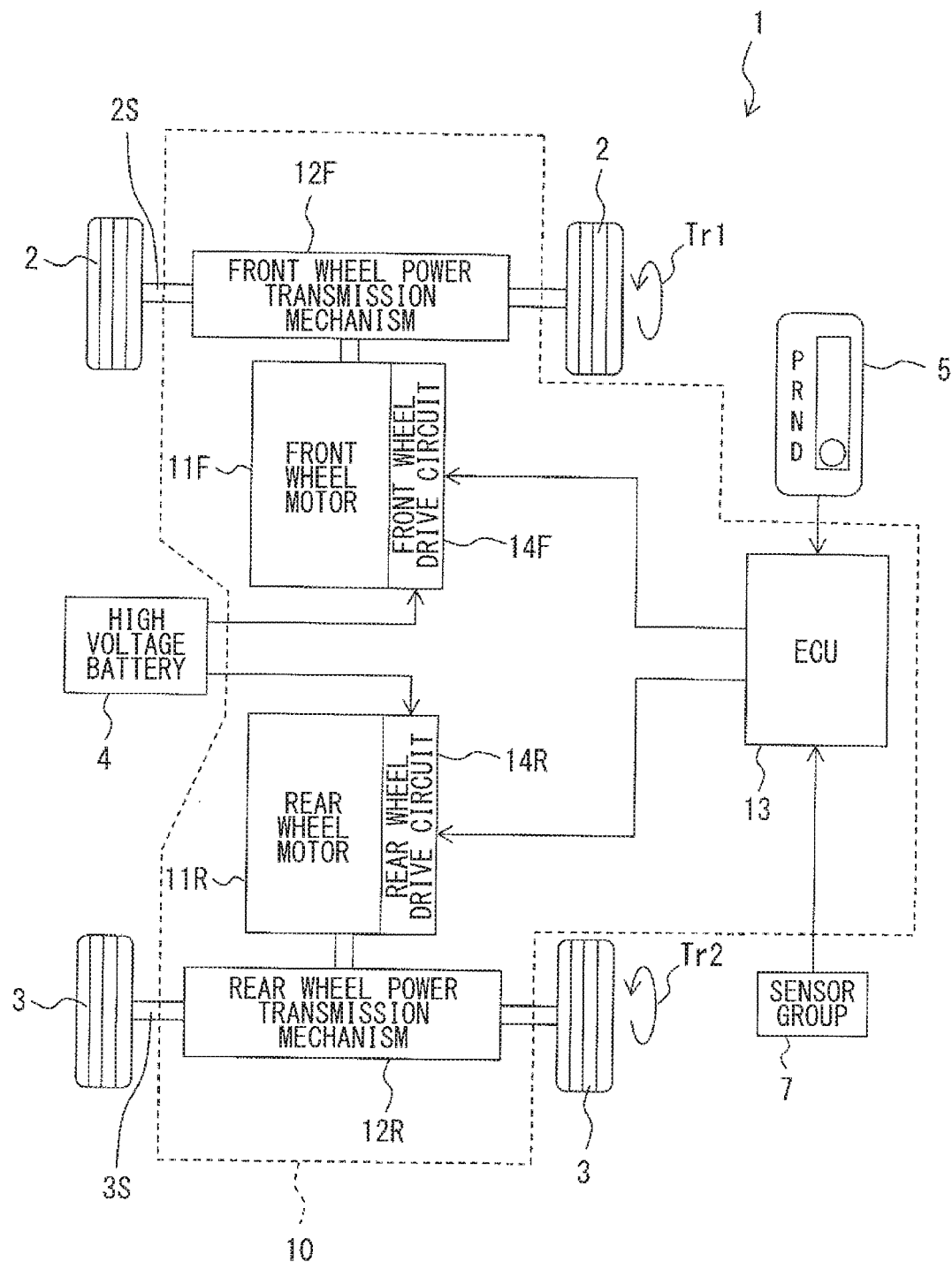
FIG. 1 is a diagram schematically illustrating an example of an outline configuration of a vehicle including a vehicle driving apparatus according to one example embodiment of the technology.

In the following, a description is given of one example embodiment of the technology, with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a dimension of each of the elements, a size of each of the elements, a ratio between the elements, relative positional relationship between the elements, a material of each of the elements, and any other specific numerical value are illustrative only and not to be construed as limiting to the technology unless being specified. Further, elements in the following example embodiments which are not recited in a most-generic independent claim of the disclosure are optional and may be provided on an as-needed basis. Throughout the present specification and the drawings, elements substantially the same as or equivalent to each other are denoted with the same numerals to avoid any redundant description. Elements not directly related to one embodiment of the technology may not be illustrated. The description is given in the following order.

1. Example Embodiment (An example of a vehicle including a vehicle driving apparatus that includes a motor directed to front wheel driving, a power transmission mechanism directed to front wheel driving, a motor directed to rear wheel driving, and a power transmission mechanism directed to rear wheel driving)

2. Modification Examples

A vehicle driving apparatus including a motor, as described above, has a backlash and play at a gear mechanism that transmits driving force from the motor to a wheel. The backlash, the play, or other factors in the gear mechanism can cause a gear rattle due to a torque ripple of the motor.

It is desirable to provide a vehicle driving apparatus that makes it more difficult for such a gear rattle to occur.

1. Example Embodiment

[Outline Configuration of Vehicle 1]

FIG. 1 schematically illustrates an example of an outline configuration of a vehicle 1 including a vehicle driving apparatus 10 according to one example embodiment of the technology. As illustrated in FIG. 1, the vehicle 1 may include a pair of front wheels 2 and a pair of rear wheels 3. The vehicle 1 may be an electric vehicle (EV) and may travel in response to rotation of the pair of the front wheels 2, the pair of the rear wheels 3, or both. The pair of the front wheels 2 and the pair of the rear wheels 3 may be rotated by driving force transmitted from the vehicle driving apparatus 10. The paired front wheels 2 may be fixed to respective ends of an axle 2S that is held by a front wheel power transmission mechanism 12F, which will be described later. The paired rear wheels 3 may be fixed to respective ends of an axle 3S that is held by a rear wheel power transmission mechanism 12R, which will be described later. In one embodiment, the front wheel 2 may serve as a "first wheel." In one embodiment, the rear wheel 3 may serve as a "second wheel."

The vehicle 1 may also include, for example, a high voltage battery 4, a shift operation unit 5, and a sensor group 7.

The high voltage battery 4 may be a secondary battery that mainly accumulates direct-current power necessary to make the vehicle 1 travel and supply the stored direct-current power to the vehicle driving apparatus 10.

The shift operation unit 5 may receive shift operation that is performed by a driver to select a drive state of the vehicle 1. For example, the shift operation unit 5 may allow for operation to select one of four ranges, that is, a parking range "P", a reverse range "R", a neutral range "N", and a drive range "D". The parking range "P" may be selected to lock rotation of the front wheels 2 and the rear wheels 3 at the time of parking. The reverse range "R" may be selected to cause the vehicle 1 to travel rearward. The neutral range "N" may be selected to shut off transmission of driving torque from the vehicle driving apparatus 10 to the front wheels 2 and the rear wheels 3. The drive range "D" may be selected to cause the vehicle 1 to travel frontward. Upon receiving the shift operation performed by the driver, the shift operation unit 5 may detect the selected range by using a device such as a position sensor. The shift operation unit 5 may further transmit a detection signal including information of the selected range, to an electronic control unit (ECU) 13, which will be described later.

The sensor group 7 may include, for example, a plurality of sensors that detect information such as circumstances of the vehicle 1 and the drive state of the vehicle 1. Specific but non-limiting examples of the sensors of the sensor group 7 may include a temperature sensor, an accelerator position sensor, a speed sensor, and a gradient sensor. The temperature sensor may measure temperatures of, for example, a front wheel motor 11F, a rear wheel motor 11R, a front wheel drive circuit 14F, and a rear wheel drive circuit 14R. The front wheel drive circuit 14F and the rear wheel drive circuit 14R will be described later. The accelerator position sensor may measure a position of an accelerator. The speed sensor may measure a travel speed of the vehicle 1. The gradient sensor may measure a gradient of a road surface on which the vehicle 1 travels. The sensor group 7 may cause the various sensors described above to transmit, to the ECU 13, respective detection signals containing various kinds of information.

[Configuration of Vehicle Driving Apparatus 10]

As illustrated in FIG. 1, the vehicle driving apparatus 10 may include, for example, the front wheel motor 11F, the rear wheel motor 11R, the front wheel power transmission mechanism 12F, the rear wheel power transmission mechanism 12R, the ECU 13, the front wheel drive circuit 14F, and the rear wheel drive circuit 14R.

The front wheel motor 11F may be, for example, a three-phase alternating-current motor and may be configured to generate driving torque that rotates the front wheels 2 with the use of alternating-current power received from the front wheel drive circuit 14F. This driving torque is hereinafter also referred to as "driving torque Tr1" for description purpose. In one embodiment, the front wheel motor 11F may serve as a "first motor." The driving torque Tr1 may rotate the front wheels 2 in a frontward direction to cause the vehicle 1 to travel frontward. The driving torque Tr1 may rotate the front wheels 2 in a rearward direction to cause the vehicle 1 to travel rearward.

In one embodiment, the front wheel power transmission mechanism 12F may serve as a "first power transmission mechanism." The front wheel power transmission mechanism 12F may be configured to receive the driving torque Tr1 from the front wheel motor 11F and transmit the received driving torque Tr1 to the front wheels 2 via the axle 2S. The front wheel power transmission mechanism 12F may be a gear mechanism including, for example, a torque converter, a transmission, and a differential gear.

The rear wheel motor 11R may be, for example, a three-phase alternating-current motor and may be configured to generate driving torque that rotates the rear wheels 3 with the use of alternating-current power received from the rear wheel drive circuit 14R. This driving torque is hereinafter also referred to as "driving torque Tr2" for description purpose. In one embodiment, the rear wheel motor 11R may serve as a "second motor." The driving torque Tr2 may work in a manner similar to that of the driving torque Tr1. That is, the driving torque Tr2 may rotate the rear wheels 3 in the frontward direction to cause the vehicle 1 to travel frontward. The driving torque Tr2 may rotate the rear wheels 3 in the rearward direction to cause the vehicle 1 to travel rearward.

In one embodiment, the rear wheel power transmission mechanism 12R may serve as a "second power transmission mechanism." The rear wheel power transmission mechanism 12R may be configured to receive the driving torque Tr2 from the rear wheel motor 11R and transmit the received driving torque Tr2 to the rear wheels 3 via the axle 3S. The rear wheel power transmission mechanism 12R may be a gear mechanism including, for example, a torque converter, a transmission, and a differential gear.

The front wheel drive circuit 14F and the rear wheel drive circuit 14R may each receive direct-current power from the high voltage battery 4, convert the received direct-current power into alternating-current power on the basis of a control signal from the ECU 13. The front wheel drive circuit 14F and the rear wheel drive circuit 14R may further output the alternating-current power to the front wheel motor 11F and the rear wheel motor 11R, respectively.

In one embodiment, the ECU 13 may serve as a "controller." The ECU 13 may comprehensively determine the travel state of the vehicle 1 on the basis of various kinds of information such as detection signals from devices such as the shift operation unit 5 or the sensor group 7. Further, the ECU 13 may control driving operation of the vehicle 1 on the basis of a result of the determination. The ECU 13 may include, for example but not limited to, a microcomputer having devices such as a central processing unit (CPU), a read-only memory (ROM), or a random-access memory (RAM). The ECU 13 may output an appropriate torque signal to the front wheel drive circuit 14F in accordance with the travel state of the vehicle 1 to control operation of the front wheel motor 11F. The ECU 13 may output an appropriate torque signal to the rear wheel drive circuit 14R in accordance with the travel state of the vehicle 1 to control operation of the rear wheel motor 11R. That is, the ECU 13 may be configured to increase or decrease the alternating-current power supplied from the front wheel drive circuit 14F to the front wheel motor 11F and thereby increase or decrease the driving torque Tr1. The ECU 13 may be configured to increase or decrease the alternating-current power supplied from the rear wheel drive circuit 14R to the rear wheel motor 11R and thereby increase or decrease the driving torque Tr2. The ECU 13 may perform torque distribution control, for example, in a case where the vehicle 1 satisfies a gear rattle occurrence condition. The torque distribution control may adjust a ratio between the magnitude of the driving torque Tr1 and the magnitude of the driving torque Tr2. For example, in a case where the driving torque Tr1 is greater than the driving torque Tr2, the torque distribution control may so cause the front wheel motor 11F to be driven that the driving torque Tr1 decreases and so cause the rear wheel motor 11R to be driven that the driving torque Tr2 increases. In a case where the driving torque Tr2 is greater than the driving torque Tr1, the torque distribution control may so cause the front wheel motor 11F to be driven that the driving torque Tr1 increases and so cause the rear wheel motor 11R to be driven that the driving torque Tr2 decreases. In one example embodiment, the ECU 13 may so perform the above-described torque distribution control that the sum of the driving torque Tr1 and the driving torque Tr2 agrees with torque necessary to make the vehicle 1 travel.

In a case where the gear rattle occurrence condition is satisfied, a gear rattle may occur in one or both of a transmission path of the driving torque Tr1 from the front wheel motor 11F to the front wheels 2 and a transmission path of the driving torque Tr2 from the rear wheel motor 11R to the rear wheels 3. The transmission path of the driving torque Tr1 may be, for example, inside the front wheel power transmission mechanism 12F. The transmission path of the driving torque Tr2 may be, for example, inside the rear wheel power transmission mechanism 12R. The gear rattle described in this example embodiment may be caused by a backlash or play between gears that mesh with each other inside the front wheel power transmission mechanism 12F or inside the rear wheel power transmission mechanism 12R. It may be considered that the gear rattle occurs at the time a direction of contact between the tooth of one of the gears and the tooth of the other gear is switched.

The ECU 13 performs the torque distribution control described above in a case where, a condition is satisfied, as the gear rattle occurrence condition, that: the travel speed of the vehicle 1 is equal to or lower than a predetermined speed; the driving torque Tr1 is greater than a first threshold Th1 (Tr1>Th1); and the driving torque Tr2 is smaller than a second threshold Th2 (Tr2<Th2). For example, on a condition that: the travel speed of the vehicle 1 is an extremely-low speed of 1 km/h or lower; the driving torque Tr1 of the front wheel motor 11F that drives the front wheels 2 is in a region in which ripple vibrations occur (the driving torque Tr1 is greater than the first threshold Th1); and the driving torque Tr2 for the rear wheels 3 is approximately zero (the driving torque Tr2 is smaller than the second threshold Th2 that is set smaller than the first threshold Th1), the rear wheels 3 may be influenced by a pulsatory motion due to a torque ripple. This may cause frequent switching of the direction of contact between the gears that mesh with each other inside the rear wheel power transmission mechanism 12R. As a result, the gear rattle may occur. Therefore, on a condition that: the vehicle 1 travels at the extremely-low speed; the driving torque Tr1 for the front wheels 2 is in the region in which the pulsatory motion due to the torque ripple easily occurs; and the driving torque Tr2 for the rear wheels 3 is in a region close to zero, the torque distribution control may be performed to suppress the gear rattle.

In one example embodiment, when the vehicle 1 shifts from a usual travel state to a torque-distribution-controlled travel state, the ECU 13 may so perform the torque distribution control as to continuously decrease the driving torque Tr1 and continuously increase the driving torque Tr2. The usual travel state may be a state in which the vehicle 1 does not satisfy the above-described gear rattle occurrence condition and a usual torque control is performed. The torque-distribution-controlled travel state may be a state in which the vehicle 1 satisfies the above-described gear rattle occurrence condition and the torque distribution control is performed. This may be directed to alleviating of variation in the travel state of the vehicle 1 accompanying variation in the driving torques Tr1 and Tr2, which makes it more difficult to give uncomfortable vibrations to a passenger in the vehicle 1.

In one example embodiment, the ECU 13 may perform the torque distribution control on the basis of a gradient of a road surface on which the vehicle 1 travels. One reason for this is that the occurrence of the gear rattle is further suppressed by setting the driving torques Tr1 and Tr2 on the basis of the gradient of the road surface. This may be based on one reason that easiness of occurrence of the gear rattle varies depending on whether the vehicle 1 travels on an upward slope or a downward slope, as a result of variation in magnitude of the driving torque at which the pulsatory motion due to the torque ripple easily occurs.

In one example embodiment, the ECU 13 may perform the above-described torque distribution control on a condition that: a temperature T1 of the front wheel motor 11F is equal to or lower than a reference temperature TP1 (T1≤TP1); and a temperature T2 of the rear wheel motor 11R is equal to or lower than a reference temperature TP2 (T2≤TP2). In this example embodiment, the temperature T1 of the front wheel motor 11F may be, for example, a temperature of a coil inside the front wheel motor 11F, and the temperature T2 of the rear wheel motor 11R may be, for example, a temperature of a coil in the rear wheel motor 11R. In this example embodiment, the reference temperatures TP1 and TP2 may be temperatures that ensure safe driving of the front wheel motor 11F and the rear wheel motor 11R, respectively. If the above-described torque distribution control is performed in a situation that the temperature T1 of the front wheel motor 11F is higher than the reference temperature TP1 or the temperature T2 of the rear wheel motor 11R is higher than the reference temperature TP2, an excessive amount of electric power may be supplied to the front wheel motor 11F or the rear wheel motor 11R. This can result in a concern that the front wheel motor 11F or the rear wheel motor 11R is overheated and thereby damaged. Therefore, in one example embodiment, the above-described torque distribution control may be performed on a condition that: the temperature T1 is equal to or lower than the reference temperature TP1; and the temperature T2 is equal to or lower than the reference temperature TP2.

[Operation of Vehicle Driving Apparatus 10]
[Frontward Travel Operation of Vehicle]

To cause the vehicle 1 to travel frontward by using the vehicle driving apparatus 10, a driver may operate the shift operation unit 5 and select the drive range "D". When the drive range "D" is selected, the ECU 13 may output an appropriate torque signal to each of the front wheel drive circuit 14F and the rear wheel drive circuit 14R to start the front wheel motor 11F and the rear wheel motor 11R. The front wheel motor 11F may generate the driving torque Tr1 directed to rotating of the front wheels 2 in the frontward direction. The rear wheel motor 11R may generate the driving torque Tr2 directed to rotating of the rear wheels 3 in the frontward direction. Thereby, the driving torque Tr1 may be transmitted to the front wheels 2 via the front wheel power transmission mechanism 12F and the axle 2S, thereby rotating the front wheels 2 in the frontward direction. The driving torque Tr2 may be transmitted to the rear wheels 3 via the rear wheel power transmission mechanism 12R and the axle 3S, thereby rotating the rear wheels 3 in the frontward direction. As a result, the vehicle 1 may travel frontward.

[Rearward Travel Operation of Vehicle]

To cause the vehicle 1 to travel rearward by using the vehicle driving apparatus 10, the driver may operate the shift operation unit 5 and select the reverse range "R". When the reverse range "R" is selected, the front wheel drive circuit 14F and the rear wheel drive circuit 14R may respectively make the front wheel motor 11F and the rear wheel motor 11R start, on the basis of the respective torque signals output from the ECU 13. In response to this, the front wheel motor 11F may generate the driving torque Tr1 directed to rotating of the front wheels 2 in a direction opposite to the direction at the time of causing the vehicle 1 to travel frontward. The rear wheel motor 11R may generate the driving torque Tr2 directed to rotating of the rear wheels 3 in the direction opposite to the direction at the time of causing the vehicle 1 to travel frontward. Thereby, the front wheels 2 and the rear wheels 3 may be rotated in the direction opposite to the direction at the time of causing the vehicle 1 to travel frontward, thereby causing the vehicle 1 to travel rearward.

[Torque Distribution Control]

Figure 2:
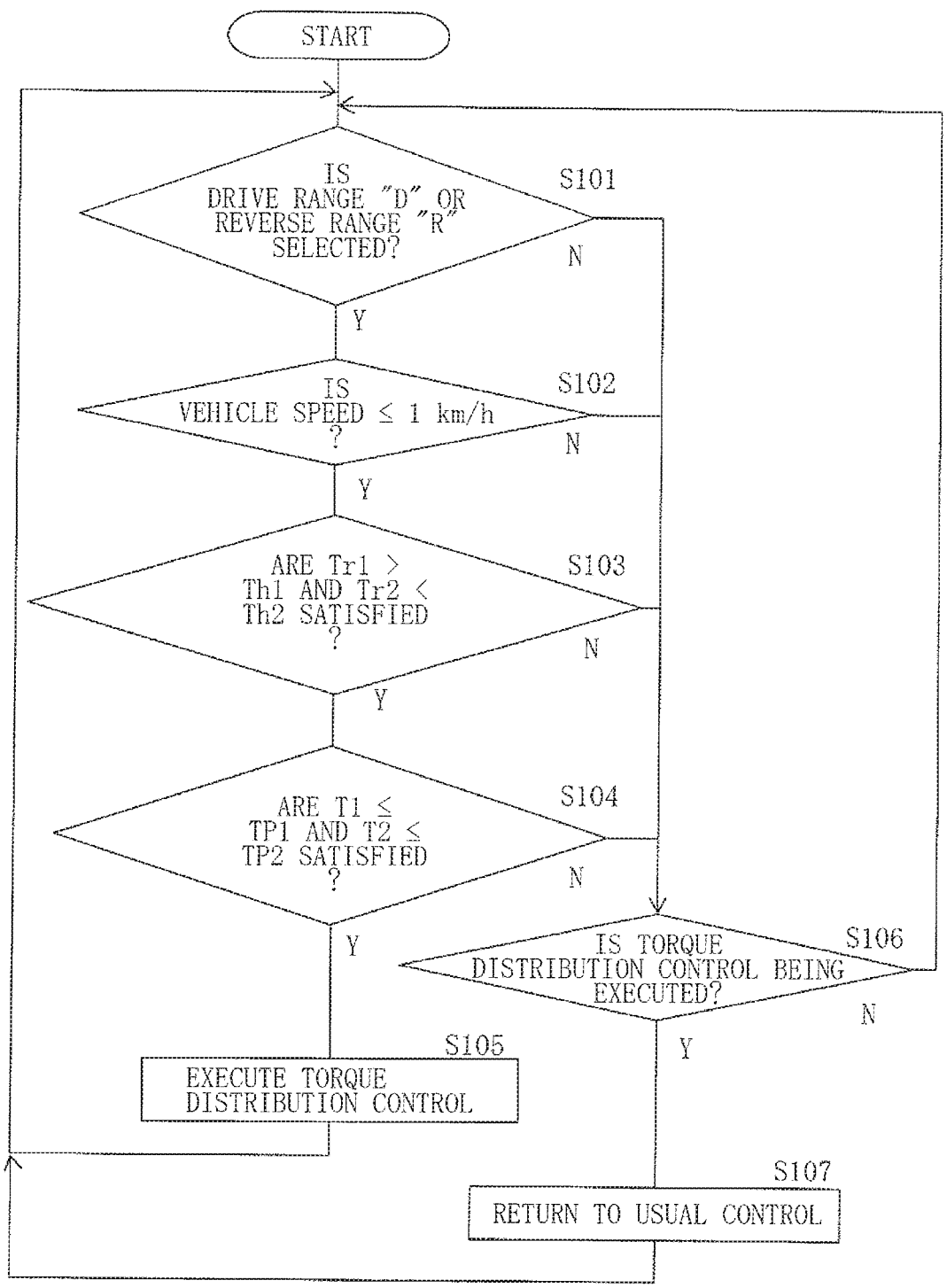
FIG. 2 is a flowchart illustrating an example of torque distribution control performed by the vehicle driving apparatus illustrated in FIG. 1.

The ECU 13 of the vehicle 1 may perform the torque distribution control in accordance with the procedure described below. FIG. 2 is a flowchart illustrating a flow of the torque distribution control performed by the vehicle driving apparatus 10.

First, the ECU 13 may determine whether the drive range "D" or the reverse range "R" is selected at the shift operation unit 5, from a detection signal supplied from the shift operation unit 5 (step S101).

In the case where it is determined that the drive range "D" or the reverse range "R" is selected at the shift operation unit 5 (Y in step S101), the ECU 13 may determine whether the travel speed of the vehicle 1 is equal to or lower than the predetermined speed, from a detection signal supplied from the vehicle speed sensor of the sensor group 7 (step S102). For example, the predetermined speed may be 1 km/h.

In the case where it is determined that the travel speed of the vehicle 1 is equal to or lower than the predetermined speed (Y in step S102), the ECU 13 may determine whether the driving torque Tr1 is greater than the first threshold Th1 (Tr1>Th1), and the driving torque Tr2 is smaller than the second threshold Th2 (Tr2<Th2) (step S103). The second threshold Th2 may be set to be smaller than the first threshold Th1.

In the case where Tr1>Th1 and Tr2<Th2 are both satisfied (Y in step S103), the ECU 13 may determine whether the temperature T1 is equal to or lower than the reference temperature TP1 (T1≤TP1), and the temperature T2 is equal to or lower than the reference temperature TP2 (T2≤TP2) (step S104).

In the case where T1≤TP1 and T2≤TP2 are both satisfied (Y in step S104), the ECU 13 may execute the torque distribution control (step S105). In this case, for example, on a condition that the driving torque Tr1 is greater than the driving torque Tr2 (Tr1>Tr2), the front wheel motor 11F may be so driven as to cause the front wheel power transmission mechanism 12F to decrease the driving torque Tr1, and the rear wheel motor 11R may be so driven as to cause the rear wheel power transmission mechanism 12R to increase the driving torque Tr2. At this time, in one example embodiment, the ECU 13 may perform the above-described torque distribution control to cause the sum of the driving torques Tr1 and Tr2 to agree with required torque necessary to make the vehicle 1 travel.

Figure 3A:
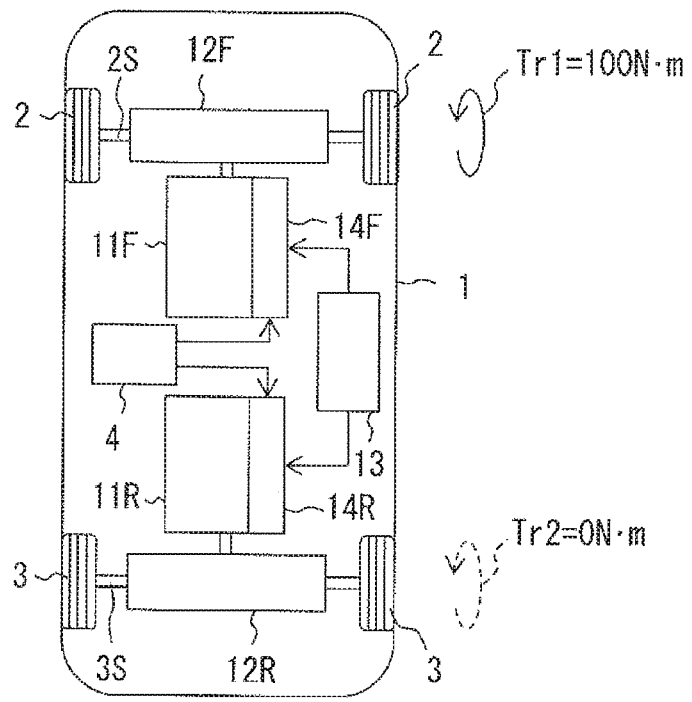
FIG. 3A is an explanatory diagram schematically illustrating an example of a usual travel state of the vehicle illustrated in FIG. 1.
Figure 3B:
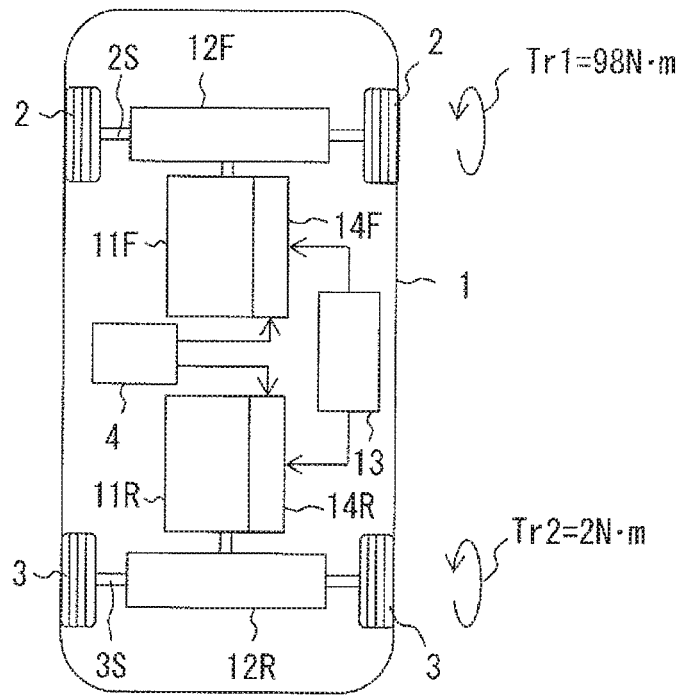
FIG. 3B is an explanatory diagram schematically illustrating an example of a torque-distribution-controlled travel state of the vehicle illustrated in FIG. 1.

In a specific but non-limiting example, in the usual travel state illustrated in FIG. 3A, 100% of required torque of 100 N·m may be distributed to the front wheel motor 11F as driving torque, and 0% of the required torque may be distributed to the rear wheel motor 11R as driving torque. In other words, the driving torque Tr1 may be 100 N·m, and the driving torque Tr2 may be 0 N·m. In these conditions, little load may be applied to the rear wheel power transmission mechanism 12R. Therefore, it may be considered that a gear rattle easily occurs especially inside the rear wheel power transmission mechanism 12R in this condition. In view of this, the vehicle driving apparatus 10 of one example embodiment of the technology may cause approximately 98% of the required torque of 100 N·m to be distributed to the front wheel motor 11F as the driving torque Tr1 and to cause approximately 2% of the required torque to be distributed to the rear wheel motor 11R as the driving torque Tr2, in the torque-distribution-controlled travel state in which the torque distribution control is performed. The torque-distribution-controlled travel state is illustrated in FIG. 3B. In other words, the driving torque Tr1 may be 98 N·m, and the driving torque Tr2 may be 2 N·m. Executing such torque distribution control mainly reduces play inside the rear wheel power transmission mechanism 12R, thereby stabilizing the direction of contact between the teeth of the gears. As a result, the gear rattle is reduced in the rear wheel power transmission mechanism 12R. An amount of decrease in the driving torque Tr1 and an amount of increase in the driving torque Tr2 in executing the torque distribution control may be, for example, several percent of the required torque.

In one example embodiment, the ECU 13 may perform the torque distribution control on the basis of the gradient of the road surface on which the vehicle 1 travels. In one example embodiment, the ECU 13 may appropriately correct the driving torques Tr1 and Tr2, in accordance with the vehicle speed, on the basis of gradient information of the road surface from the gradient sensor of the sensor group 7 and vehicle speed information from the vehicle speed sensor of the sensor group 7. At this time, the ECU 13 may refer to, for example, a look-up table that is preliminarily stored in an internal memory of the ECU 13 and may subtract appropriate correction torque from the driving torque Tr1 or add appropriate correction torque to the driving torque Tr2, in accordance with the gradient of the road surface and the vehicle speed.

FIG. 4 illustrates a look-up table describing a relationship between a torque correction amount and a combination of a gradient [deg] and a vehicle speed [km/h]. FIG. 4 describes appropriate correction torques corresponding to seven levels of the vehicle speed in a range from −3 to +3 [km/h]. The seven levels of the vehicle speed are set for each of seven levels of gradient, that are −20, −10, −5, 0, +5, +10, +15 [deg]. In this look-up table, the negative sign of the gradient represents a downward slope descending in the direction in which the vehicle 1 travels, and the positive sign of the gradient may represent an upward slope ascending in the direction in which the vehicle 1 travels. The gradient of 0 (zero) represents a flat ground. The negative sign of the vehicle speed represents rearward traveling of the vehicle 1, and the positive sign of the vehicle speed represents frontward traveling of the vehicle 1. The vehicle speed of 0 (zero) represents stopping of the vehicle 1. FIG. 4 describes a torque correction amount to be subtracted from the driving torque Tr1, in other words, a torque correction amount to be added to the driving torque Tr2, on the condition that Tr1 is greater than Tr2 and the required torque is 100.

According to FIG. 4, in a case where the gradient is 0 (zero), i.e., where the vehicle 1 travels on a flat ground, the following correction may be performed. That is, in a case where the vehicle speed is higher than 0 and equal to or lower than 0.1 km/h, correction may be so made that the driving torque Tr1 is decreased by 4 and the driving torque Tr2 is increased by 4. In a case where the vehicle speed is higher than 0.1 km/h and equal to or lower than 1 km/h, correction may be so made that the driving torque Tr1 is decreased by 2 and the driving torque Tr2 is increased by 2. In a case where the vehicle speed is higher than 1 km/h, the driving torque Tr1 and the driving torque Tr2 may not be varied. The above refers to the case of causing the vehicle 1 to travel frontward; however, correction may be performed in a manner similar to that described above also when the vehicle 1 is caused to travel rearward in the case where the gradient is 0 (zero).

Figure 5A:
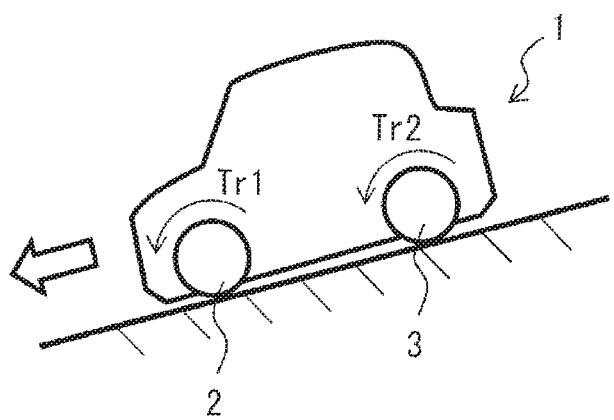
FIGS. 5A to 5D each schematically illustrate an example of a travel state of the vehicle illustrated in FIG. 1.

A region "A" that is surrounded by a dashed line in FIG. 4 may correspond to a case where the vehicle 1 travels frontward while descending a slope. This case is illustrated in FIG. 5A. In the region "A", as the gradient of the slope is greater, and as the vehicle speed is higher, it is more difficult for the torque ripple to occur. However, compared with a case in a region "C", which will be described later, the torque ripple may occur more easily because self-weight of the vehicle 1 accelerates the speed. Therefore, the correction amounts of the driving torques Tr1 and Tr2 may be greater.

Figure 5B:
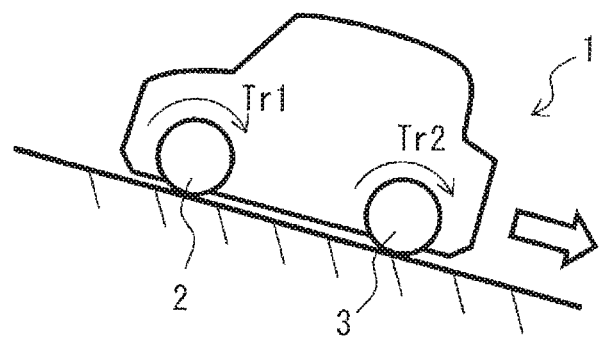

A region "B" that is surrounded by a dashed line in FIG. 4 may correspond to a case where the vehicle 1 travels rearward while descending a slope. This case is illustrated in FIG. 5B. In this case, the reverse range "R" may be selected at the shift operation unit 5, and the self-weight of the vehicle 1 may be applied at any time in the direction in which the vehicle 1 travels rearward. This substantially eliminates play. Therefore, a gear rattle may not occur, and the torque distribution control may not be executed substantially.

Figure 5C:
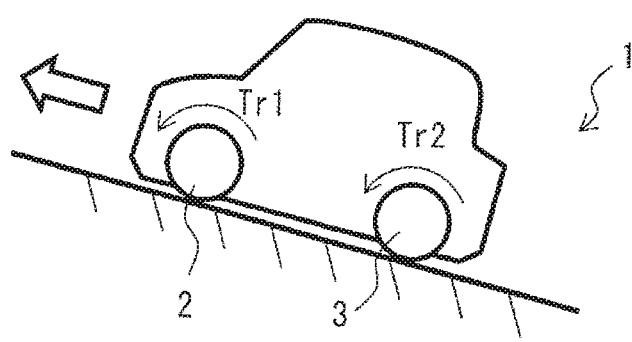

A region "C" that is surrounded by a dashed line in FIG. 4 may correspond to a case where the vehicle 1 travels frontward while ascending a slope. This case is illustrated in FIG. 5C. In this case, the self-weight of the vehicle 1 may be applied at any time in a direction opposite to the direction in which the vehicle 1 travels, i.e., in the rearward direction. Therefore, it may be expected that play is reduced. In consideration of this, compared with the case in the region "A", smaller correction amounts of the driving torque Tr1 and the driving torque Tr2 may be sufficient.

Figure 5D:
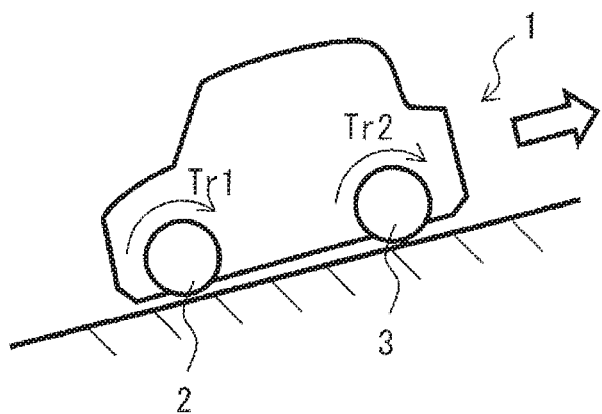

A region "D" that is surrounded by a dashed line in FIG. 4 may correspond to a case where the vehicle 1 travels rearward while ascending a slope. This case is illustrated in FIG. 5D. In this case, the self-weight of the vehicle 1 may be applied at any time in a direction opposite to the direction in which the vehicle 1 travels, i.e., in the frontward direction. Nevertheless, on a condition that the vehicle speed is low and is equal to or lower than −1 km/h, the correction amounts of the driving torque Tr1 and the driving torque Tr2 may be greater.

Referring again to FIG. 2, after the torque distribution control is executed in step S105, the flow may return to step S101.

The flow may advance to step S106 in any of the following cases: a case where it is determined that none of the drive range "D" and the reverse range "R" is selected at the shift operation unit 5 (N in step S101); a case where the travel speed of the vehicle 1 is determined as not being equal to or lower than the predetermined speed (N in step S102); a case where it is determined that Tr1>Th1, Tr2<Th2, or both are not satisfied (N in step S103); and a case where it is determined that T1≤TP1, T2≤TP2, or both are not satisfied (N in step S104). In step S106, whether the torque distribution control is already being executed may be determined (step S106). In the case where it is determined that the torque distribution control is being executed (Y in step S106), the torque control may be changed to the usual torque control to make the travel state return to the usual travel state (step S107). Thereafter, the flow may return to step S101. In the case where it is determined that the torque distribution control is being executed in step S106, a predetermined time may be provided before the torque control is changed to the usual torque control. One reason for this is to avoid occurrence of hunting in which switching between the torque-distribution-controlled travel state and the usual travel state frequently occurs in a case where the drive state of the vehicle 1 is unstable. In a case where it is determined that the torque distribution control is not being executed in step S106 (N in step S106), the flow may return straight to step S101.

[Example Workings and Example Effects of Vehicle Driving Apparatus 10]

As described above, in the vehicle driving apparatus 10 of one example embodiment of the technology and the vehicle 1 including the vehicle driving apparatus 10, the ECU 13 so performs, in the case where the driving torque Tr1 that rotates the front wheels 2 is greater than the driving torque Tr2 that rotates the rear wheels 3, the torque distribution control as to decrease the driving torque Tr1 and increase the driving torque T2. This reduces play inside the front wheel power transmission mechanism 12F due to a torque ripple of the front wheel motor 11F and reduces play inside the rear wheel power transmission mechanism 12R due to a torque ripple of the rear wheel motor 11R. As a result, it is possible to suppress occurrence of a gear rattle inside the front wheel power transmission mechanism 12F or inside the rear wheel power transmission mechanism 12R.

In one example embodiment, the ECU 13 may so perform the above-described torque distribution control that the sum of the driving torque Tr1 and the driving torque Tr2 agrees with required torque necessary to make the vehicle 1 travel. In addition thereto, a direction in which the driving torque Tr1 is generated and a direction in which the driving torque Tr2 is generated may be caused to agree with each other. This achieves efficient traveling in accordance with the required torque. To reduce play inside the front wheel power transmission mechanism 12F or inside the rear wheel power transmission mechanism 12R, for example, the direction in which the driving torque Tr1 is generated and the direction in which the driving torque Tr2 is generated may be opposite to each other. In a specific but non-limiting example, in a case where the required torque is 100 N·m, the driving torque Tr1 may be set to 102 N·m in a direction in which the vehicle 1 travels frontward, and the driving torque Tr2 may be set to 2 N·m in a direction in which the vehicle 1 travels rearward. However, in such a case, the driving torque Tr1 and the driving torque Tr2 are respectively transmitted to the front wheels 2 and the rear wheels 3 in directions that cause mutual canceling of the driving torques Tr1 and Tr2. This may generate driving torque that does not contribute to traveling of the vehicle 1.

Causing the direction in which the driving torque Tr1 is generated and the direction in which the driving torque Tr2 is generated to agree with each other prevents generation of extra driving torque. This suppresses an amount of heat generated in the front wheel motor 11F and an amount of heat generated in the rear wheel motor 11R. This makes it possible to avoid limiting of a load factor and to reduce consumption of electric power.

Moreover, causing the direction in which the driving torque Tr1 is generated and the direction in which the driving torque Tr2 is generated to agree with each other eliminates the need to generate the driving torque Tr1 or Tr2 that is greater than the required torque. This avoids sudden starting of the vehicle 1 beyond expectation of the driver even when one of the driving torque Tr1 and the driving torque Tr2 is lost due to any trouble. Therefore, sufficient safety is maintained.

Furthermore, causing the direction in which the driving torque Tr1 is generated and the direction in which the driving torque Tr2 is generated to agree with each other makes it more difficult for a wheel speed to decrease on a low-friction road surface and also provides a superior traveling performance, compared with a case where the direction in which the driving torque Tr1 is generated and the direction in which the driving torque Tr2 is generated are opposite to each other.

In one example embodiment of the technology, the driving torque Tr1 and the driving torque Tr2 are controlled in a well-devised manner by the ECU 13 to thereby suppress occurrence of the gear rattle. This makes it possible to suppress the occurrence of the gear rattle without providing an additional mechanism such as a damper. Therefore, a reduction in size or weight of the vehicle driving apparatus 10 is not prevented.

According to a vehicle driving apparatus of one embodiment of the technology, a controller performs torque distribution control. This reduces play in any of a first power transmission mechanism and a second power transmission mechanism. This makes it possible to suppress occurrence of a gear rattle in any of the first power transmission mechanism and the second power transmission mechanism.

2. Modification Examples

Although an example embodiment of the technology has been described in the foregoing, the technology is by no means limited to the example embodiment described above and is variously modifiable.

For example, in the forgoing example embodiment, the front wheel 2 may serve as the "first wheel" and the rear wheel 3 may serve as the "second wheel." Further, in the usual travel state, the driving torque Tr1 transmitted to the front wheels 2 is made greater than the driving torque Tr2 transmitted to the rear wheels 3. In the torque-distribution-controlled travel state, the driving torque Tr1 may be decreased and the driving torque Tr2 may be increased. However, the technology is not limited thereto. In a specific but non-limiting example, the rear wheel 3 may serve as the "first wheel" and the front wheel 2 may serve as the "second wheel." Further, in this case, the driving torque Tr1 transmitted to the rear wheels 3 may be made greater than the driving torque Tr2 transmitted to the front wheels 2 in the usual travel state. In the torque-distribution-controlled travel state, the driving torque Tr1 may be decreased and the driving torque Tr2 may be increased. In this example embodiment, the rear wheel motor 11R may serve as the "first motor", the front wheel motor 11F may serve as the "second motor", the rear wheel power transmission mechanism 12R may serve as the "first power transmission mechanism", and the front wheel power transmission mechanism 12F may serve as the "second power transmission mechanism."

In the forgoing example embodiment, in the torque-distribution-controlled travel state, approximately 98% of the required torque is distributed to the front wheel motor 11F as the driving torque Tr1, and approximately 2% of the required torque is distributed to the rear wheel motor 11R as the driving torque Tr2. The value of this distribution ratio is, however, a mere example, and the value of the distribution ratio may be set to any value.

Although the forgoing example embodiment is illustrated by an example of the vehicle driving apparatus mounted on an electric automobile, the technology is not limited thereto. One embodiment of the technology is also applicable to, for example, a rotatable member driving apparatus that is mounted on a vehicle other than an automobile, such as a ship or an aircraft, and drives a rotatable member of the vehicle. One embodiment of the technology is also applicable to, for example, a rotatable member driving apparatus that is mounted on an apparatus that does not travel, such as construction machinery or a working robot, and drives a rotatable member of the apparatus.

The effects described in this specification are merely examples. The effects are not limited thereto and any other effect may be provided.

The ECU 13 illustrated in FIG. 1 is implementable by circuitry including at least one semiconductor integrated circuit such as at least one processor (e. g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 13 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 13 illustrated in FIG. 1.

Although an embodiment of the technology has been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle driving apparatus configured to drive a vehicle including a first wheel and a second wheel, the vehicle driving apparatus comprising:
 a first motor configured to generate first driving torque that rotates the first wheel;
 a first power transmission mechanism configured to transmit the first driving torque from the first motor to the first wheel;

a second motor configured to generate second driving torque that rotates the second wheel in a direction same as a direction in which the first wheel is rotated;

a second power transmission mechanism configured to transmit the second driving torque from the second motor to the second wheel; and a controller configured to perform torque distribution control in a case where a gear rattle occurrence condition is satisfied, wherein the gear rattle occurrence condition is satisfied (1) when a travel speed of the vehicle is equal to or lower than a predetermined speed, (2) when the first driving torque is greater than a first threshold, and (3) when the second driving torque is smaller than a second threshold, wherein the second threshold is set to be smaller than the first threshold, and wherein the torque distribution control performed by the controller includes driving the first motor to decrease the first driving torque and driving the second motor to increase the second driving torque.

2. The vehicle driving apparatus according to claim 1, wherein the controller performs, when the vehicle is shifted from a usual travel state to a control travel state, the torque distribution control to thereby continuously decrease the first driving torque and continuously increase the second driving torque, the usual travel state being a state in which the gear rattle occurrence condition is not satisfied, the control travel state being a state in which the gear rattle occurrence condition is satisfied.

3. The vehicle driving apparatus according to claim 2, wherein the controller performs the torque distribution control on a basis of a gradient of a road surface on which the vehicle travels.

4. The vehicle driving apparatus according to claim 3, wherein the controller performs the torque distribution control in a case where a temperature of the first motor is equal to or lower than a first reference temperature and a temperature of the second motor is equal to or lower than a second reference temperature.

5. The vehicle driving apparatus according to claim 2, wherein the controller performs the torque distribution control in a case where a temperature of the first motor is equal to or lower than a first reference temperature and a temperature of the second motor is equal to or lower than a second reference temperature.

6. The vehicle driving apparatus according to claim 1, wherein the controller performs the torque distribution control on a basis of a gradient of a road surface on which the vehicle travels.

7. The vehicle driving apparatus according to claim 6, wherein the controller performs the torque distribution control in a case where a temperature of the first motor is equal to or lower than a first reference temperature and a temperature of the second motor is equal to or lower than a second reference temperature.

8. The vehicle driving apparatus according to claim 1, wherein the controller performs the torque distribution control in a case where a temperature of the first motor is equal to or lower than a first reference temperature and a temperature of the second motor is equal to or lower than a second reference temperature.

* * * * *